No. 747,576. PATENTED DEC. 22, 1903.
G. F. BARTON.
COASTER BRAKE.
APPLICATION FILED DEC. 31, 1900.
NO MODEL.
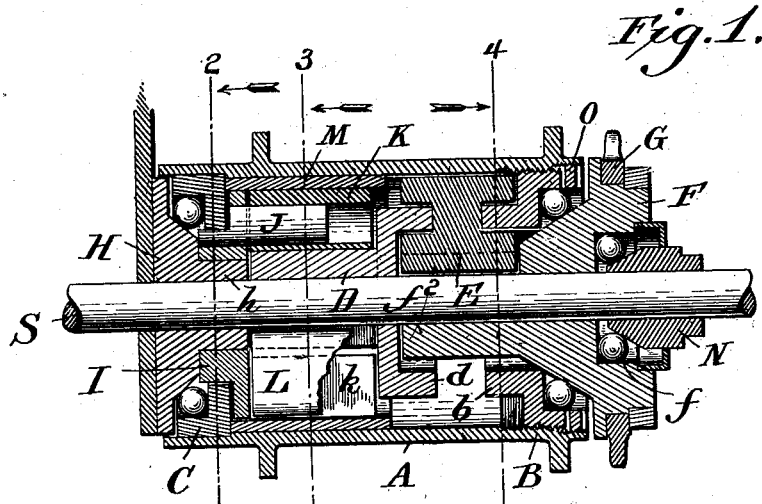
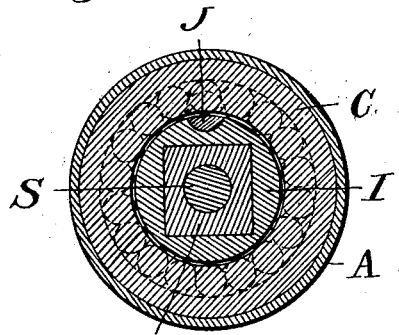
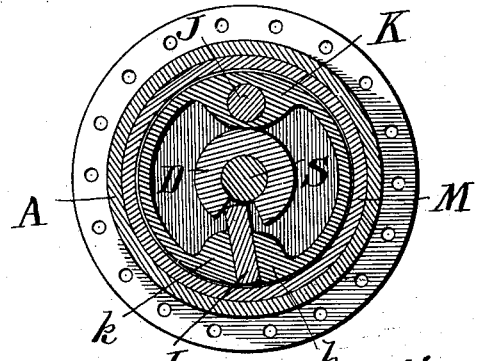
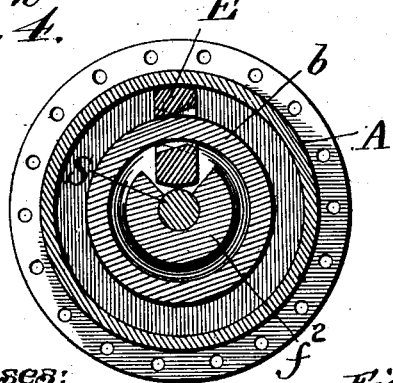
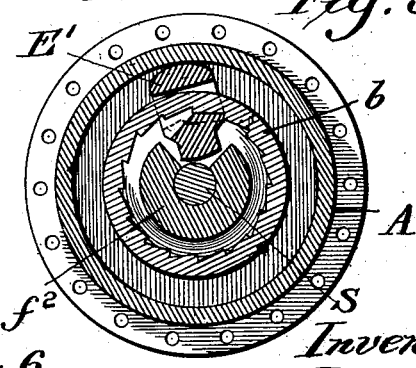
Witnesses:
J. B. McGirr.
H. L. Reynolds.
Inventor
Geo. F. Barton
by Gifford & Bull
his attys.

No. 747,576.

Patented December 22, 1903.

UNITED STATES PATENT OFFICE.

GEORGE F. BARTON, OF ELMIRA, NEW YORK, ASSIGNOR OF ONE-HALF TO FRANK F. WESTON, OF NEW YORK, N. Y.

COASTER-BRAKE.

SPECIFICATION forming part of Letters Patent No. 747,576, dated December 22, 1903.

Application filed December 31, 1900. Serial No. 41,582. (No model.)

*To all whom it may concern:*

Be it known that I, GEORGE F. BARTON, a citizen of the United States, and a resident of Elmira, in the county of Chemung and State of New York, have invented a new and Improved Coaster-Brake, of which the following is a full, clear, and exact description.

My invention relates to an improvement in coaster-brakes or devices designed for disconnecting the driving member from the hub of a wheel and capable also of being used for applying a brake to the hub of a wheel.

My invention comprises certain novel features, which will be hereinafter described, and particularly pointed out in the claims.

Reference is to be had to the accompanying drawings, forming a part of this specification, in which similar characters of reference indicate corresponding parts in all the figures.

Figure 1 is a sectional elevation of the hub of a wheel having my invention embodied therein. Fig. 2 is a cross-section upon the line 2 2 of Fig. 1. Fig. 3 is a cross-section upon the line 3 3 of Fig. 1. Fig. 4 is a cross-section on the line 4 4 of Fig. 1. Fig. 5 is a cross-section showing a modified form of dog and flange, taken upon the line corresponding with the line 4 4 of Fig. 1; and Fig. 6 is an end elevation of the dog.

I have herein illustrated my invention as applied to the hub of a wheel such as is used for bicycles and will describe the same as applied to a bicycle-wheel, although it is evident that my invention may be applied to wheels of automobiles and, in fact, to any form of wheel which it is desired to disconnect from the driving mechanism and to control by a brake after the manner of coaster-brakes.

Because the invention is described as applied to a bicycle it is not, therefore, to be understood that it is limited in its use to bicycles; but I wish to claim the invention as applied to any form of wheel.

The shaft S is ordinarily a stationary shaft—that is, has no revolution. This shaft is ordinarily supported upon the ends of the bicycle-frame. The wheel-hub A is made with a straight cylindrical opening and has the two cups B and C, forming part of the ball-bearings, secured in each end thereof by any desired means, the most common means being threading them into the hub. At one end of the hub a member H, which has a ball-race formed thereon in the form of a cone, is secured against revolution about the shaft by being supported from the frame in any preferred manner. This in connection with the cup C forms the ball-bearing for one end of the hub. At the other end of the hub two ball-bearings are provided, one of which lies between the sprocket-wheel or other driving member and the shaft and the other lies between said sprocket-wheel or driving member and the hub.

The sprocket-wheel G is herein shown as secured to a driving member F, which is provided exteriorly with a conical surface coacting with the cup B to form one of these ball-bearings. This driving member in its end is hollowed, forming or containing a cup $f$, constituting a part of the other ball-bearing. The cone N, which is secured to the shaft or otherwise held against rotation, forms the other member of the ball-bearing. The driving member is thus capable of rotation upon the shaft in either direction, and the hub is also free to rotate upon the driving member. This driving member F also has a sleeve $f^2$ extending inwardly and provided with a longitudinal slit, as clearly shown in Figs. 4 and 5. The cup B, which forms part of the ball-bearing, has a circular flange $b$ projecting inwardly and adapted to be engaged by a clutch-dog E. This clutch-dog E is provided with slots $e$ in opposite edges thereof, said slots extending across the face of the dog at a slight incline, as clearly shown in Figs. 4, 5, and 6. The width of the slots $e$ in the dog slightly exceeds the thickness of the flange $b$, so that if the dog is held in proper position the flange may rotate within said slot without the dogs binding thereon or hindering its motion. If, however, the dog be oscillated, as it would be by a right-hand rotation of the sleeve $f^2$, as shown in Fig. 4, the corners $e'$ and $e^2$ of the dog would bind upon the flange $b$ and securely grip it, and if the motion of the sleeve $f^2$ be continued the flange and the hub with which it is connected will be carried about the shaft. If, however, the motion of the sleeve is in the opposite or left-hand direction, as shown in Fig. 4, the size and shape of the slot are such that the dog would simply be lifted and there would be no binding upon the flange, and consequently the flange would not be turned by the dog in this direction. This provides the means for securing the driving member to the hub for rotation of the wheel. In the other portion of the hub is placed a brake mechanism. This is clearly shown in Fig. 3, the brake consisting of a ring or band K, which is cut on one side and is pivotally supported upon a pin J, said pin being held against rotation. The cut ends of the brake-band are provided with lugs k, which increase the thickness thereof, and the opposing surfaces of these lugs are placed at a slight angle with an axial plane, as clearly shown in Fig. 3—that is, the plane of these surfaces is not a radial plane, but inclined slightly thereto. Between these ends of the brake-band is placed a lever L, the inner end of which lies in a longitudinal groove formed in the sleeve D, which sleeve is mounted to turn upon the shaft S. To one end of this sleeve is secured a circular flange d, which enters one of the slots in the clutch-dog E. This slot is inclined in the opposite direction from the one which engages the flange b, so that when the dog is oscillated in the direction which will engage it with the flange b it will free it from the flange d, and when the dog is oscillated, so as to engage it with the flange d, it frees it from the flange b.

It is preferred that a friction-band M be inserted within the hub and outside of the brake-band K, so that the brake-band will engage this friction-band rather than the inner surface of the hub itself. When the friction-band has been seriously worn by the friction of the brake, it may be easily replaced by a new one.

The pin J, which supports the brake-band, is secured in a member I, and said member is secured to the cone member H by having a hole formed therein of non-circular section and slipping the same over a projection h on the inner end of the cone, which is of corresponding non-circular section. As shown in Fig. 2, these parts are made square. Any other form of section or any other means which will prevent rotation of these parts may be substituted for that shown. It will be observed that the construction of the parts as shown will permit their being inserted in the hub and held in place by the cups B and C. These cups may be secured in place by being threaded into the hub or in any other desired manner. The locking and adjusting ring O and cup B should be oppositely and separately threaded into the hub, after the manner common for such purposes.

The operation of my device is as follows: When the driving member F is rotated in the direction corresponding with the direction of the revolution of the wheel for driving the bicycle or other vehicle to which it is secured, it will rock the clutch-dog E in such manner as to cause it to bite and securely engage the flange b, which is secured to the hub, and thus enable the driving member to rotate the wheel. As soon as the speed of revolution of the driving member drops below that of the wheel the clutch-dog E will be freed from the flange b, and the wheel will be free to coast without there being any friction to hold it back, as the dog is lifted so as to clear the flange. If the driving member F is not turned backward, the brake is not applied. If, however, it be given a slight backward movement, it will cause the clutch-dog on its opposite side to engage the flange d and securely bite it, carrying said flange backward with it. This will cause the sleeve D to engage the inner end of the lever L and rock it in such manner as to separate the ends of the brake-band, thus expanding the band into engagement with the friction-band M and applying friction to prevent rotation of the wheel. While the driving member is being rotated forwardly or in a direction corresponding with the rotation of the wheel, the clutch-dog E will be freed from the flange d and will rotate about the same without touching it. It is possible with this device when the driving member is held without movement in either direction to rotate the driving-wheel backward, which is not possible with all forms of coaster-brakes.

One of the ball-cups, as the cup B, is locked in place by the ring O, which lies within the hub, where it is invisible, and there is no danger of its being displaced. These parts are shown as separately threaded into the hub, one having right-handed and the other left-handed threads, after the usual manner of securing such parts. The cup C at the other end may be threaded in the hub or simply made tight fit and pushed in. With the construction shown, consisting of an interiorly-cylindrical hub having one of the cups adjustably secured in its end, as shown, the cups may be relied upon to hold the driving and braking mechanism in place.

The modification shown in Fig. 5 consists in notching or forming teeth upon the inner surface of the flanges d and b, with which the teeth or corners of the dog engage, instead of leaving these surfaces smooth and relying upon the frictional contact. Each of these constructions is, however, in principle the same.

It will be evident that the particular form of flanges used for engagement by the dog E may be widely varied from that shown in Fig. 1. The essential features of such dog would seem to be that the flange, have two opposing surfaces, which are surfaces of revolution having a common center coincident with the axis of the driving member F. These surfaces may be in any position from radial to parallel with the axle and need not be parallel with each other. It is also possible that the flanges and the dog may be reversed, in that the groove may be formed upon the member corresponding with the flanges, as shown in Fig. 1, while the dog has a tooth projecting into said grooves. Such variations in construction are entirely within the scope of my invention, and the claims are designed to cover such constructions. It is also possible that the brake-band may be supported by very different constructions from that one shown.

In the claims herein the omission of any element or the failure to qualify any element is to be taken as a specific statement that such element or qualification of an element is not essential to the combination therein sought to be claimed.

Having thus fully described my invention, I claim as new and desire to secure by Letters Patent—

1. In a coaster-brake the combination with a driving member, a driven member, a brake and a brake-actuating member, said driven member and brake-actuating member each having two opposed surfaces of revolution having centers upon a common axis, of a clutch member having rocking and driving engagement with the driving member, and also having two sets of opposed surfaces corresponding with and being adapted, one set, to engage the said opposed surfaces of revolution upon the driven member and the other set to engage the similar surfaces upon the brake-actuating member when rocked to one side or the other of a central neutral position.

2. In a coaster-brake the combination with a driving member, a driven member, a brake and a brake-actuating member, said driven member and brake-actuating member having each a circular flange concentric with the same axis, of a clutch-dog having notches embracing said flanges and adapted to bite upon one flange when rocked in one direction from a central neutral position, and to bite upon the other flange when rocked in the other direction from said central neutral position, one end of said dog being engaged with and actuated by the driving member.

3. In a coaster-brake the combination with the wheel-hub, the axle, a brake adapted to engage the wheel-hub and axle, and a driving-gear journaled to turn relative to both the wheel-hub and the axle, of a brake-actuating member having a circular flange concentric with the axle, a similar flange secured to the wheel-hub, and a clutch-dog having notches embracing said flanges and adapted to bite thereon to turn the flanges in opposite directions when rocked in the respective direction from a central neutral position, one end of the dog being engaged with and rocked by the driving-gear.

4. In a coaster-brake, the combination with the wheel-hub, the axle, and expanding band-brake having a fixed support and adapted to engage the wheel-hub, and a driving-gear journaled to turn relative to both the wheel-hub and the axle, of a brake member having a circular flange concentric with the axle, a similar flange secured to the wheel-hub, and a clutch-dog having notches embracing said flanges and adapted to bite thereon to turn the flanges in opposite directions when rocked in the respective direction from a central neutral position, one end of the dog being engaged with and rocked by the driving-gear.

5. In a coaster-brake, the combination with driving mechanism, clutch mechanism, a wheel-hub, bearings therefor at each end, an expandible brake-band within said hub adapted to frictionally engage the hub, a fixed support for said band substantially equidistant from the free ends thereof, and a lever between the free ends thereof, of a brake-expanding member adapted to oscillate about the hub-axis, and an actuating-sleeve therefor carrying one of the hub-bearings and also adapted to oscillate about the hub-axis.

6. The combination with a hollow wheel-hub having bearings at each end, a friction brake-ring within and engaging said hub between said bearings, said brake-ring being cut on one side and having a lever between its ends, and a fixed support for said ring, a sleeve mounted to oscillate about the hub-axis and engaging said lever to rock it, a clutch-ring within and connected with the hub, of a driving member outside the hub, a sleeve connected with said driving member and extending within the hub, a radially-extending clutch-dog adapted to engage both clutch-rings to turn them respectively in opposite directions when correspondingly rocked, said clutch-dog engaging the sleeve which is connected with the driving member to be rocked thereby.

7. In a vehicle-wheel the combination with driving mechanism, clutch mechanism, a hollow hub, an axle, and bearings at each end of the hub, of a non-circular fixed member projecting inwardly from the bearing at one end, an expansible brake-band within said hub and between its bearings, a brake-band supporting member having an opening adapted to fit over the fixed non-circular member, and means for expanding a brake-band.

8. In a coaster-brake the combination with clutch mechanism, a wheel-hub, an expandible brake-band within and adapted to have frictional engagement with the hub, and a fixed support for the central portion of said band, of a lever between the ends of the brake-band, a driving-gear adapted to be turned backward, a member adapted to be oscillated upon the hub-axis and engaging the lever to swing it, said member having a circular flange, a radial clutch-dog having teeth adapted to bite upon said flange to turn its member backward, and connections from one end of said dog to the driving-gear.

9. In a releasable device for wheels, the combination with a hollow wheel-hub, a driving member entering the wheel-hub and rotatable about the hub-axis, and a toothed ring secured to and within the wheel-hub, of a dog having a slot embracing the ring and permitting rocking thereon, said dog being adapted to be engaged by a relatively projecting portion of the driving member to be rocked into engagement with the teeth of the ring.

10. In a coaster-brake, the combination with a driving member, a hub member, a brake and a brake-setting member, of a dog actuated from the driving member and adapted in different positions to be connected both with the hub member and the brake-setting member, said dog having a frictional engagement with a member turning with the hub adapted to carry the dog into engagement with the brake-setting member.

GEORGE F. BARTON.

Witnesses:
   JOHN CANNAN,
   WILLIAM TINKLER.